United States Patent
Jung et al.

(10) Patent No.: US 8,271,513 B1
(45) Date of Patent: Sep. 18, 2012

(54) MODULE AND METHOD FOR SEARCHING NAMED ENTITY OF TERMS FROM THE NAMED ENTITY DATABASE USING NAMED ENTITY DATABASE AND MINING RULE MERGED ONTOLOGY SCHEMA

(75) Inventors: Han Min Jung, Daejeon (KR); Pyung Kim, Daejeon (KR); Seung Woo Lee, Daejeon (KR); Mi Kyung Lee, Daejeon (KR); Dong Min Seo, Cheongju-si (KR); Won Kyung Sung, Daejeon (KR)

(73) Assignee: Korea Institute of Science and Technology Information, Daejeon (KR)

( * ) Notice: Subject to any disclaimer, the term of this patent is extended or adjusted under 35 U.S.C. 154(b) by 0 days.

(21) Appl. No.: 13/406,111

(22) Filed: Feb. 27, 2012

Related U.S. Application Data

(62) Division of application No. 13/153,404, filed on Jun. 4, 2011, now Pat. No. 8,161,061.

(51) Int. Cl.
  *G06F 17/30* (2006.01)
  *G06F 7/00* (2006.01)

(52) U.S. Cl. ....................... 707/758; 707/755

(58) Field of Classification Search .............. 707/758
  See application file for complete search history.

(56) References Cited

U.S. PATENT DOCUMENTS

| | | | |
|---|---|---|---|
| 8,041,733 B2 * | 10/2011 | Rouhani-Kalleh | 707/771 |
| 2004/0148170 A1 * | 7/2004 | Acero et al. | 704/257 |
| 2010/0036788 A1 * | 2/2010 | Wu et al. | 706/47 |

* cited by examiner

*Primary Examiner* — Kuen Lu
(74) *Attorney, Agent, or Firm* — LRK Patent Law Firm

(57) ABSTRACT

A module determining a named entity of terminology includes a named entity dictionary and mining rule database storing the named entity dictionary where named entity of terminology combined with the ontology schema and connected to concept is defined, and a mining rule database where a mining rule configured with mining pattern and RDF triple combined with the ontology schema and connected to relationship name is defined; a named entity and mining rule search unit searching for corresponding mining rule and named entity from the mining rule database and the named entity dictionary using inputted mining pattern and terminology included in the mining pattern; and a names entity selection unit selecting, if two or more named entities corresponding to the terminology are searched, named entity matching to the concept configuring the RDF triple of the searched mining rule as named entity of the terminology among the searched named entities.

9 Claims, 6 Drawing Sheets

MODULE AND METHOD FOR SEARCHING NAMED ENTITY OF TERMS FROM THE NAMED ENTITY DATABASE USING NAMED ENTITY DATABASE AND MINING RULE MERGED ONTOLOGY SCHEMA

CROSS REFERENCE TO RELATED APPLICATION

This application is a division of U.S. patent application Ser. No. 13/153,404, filed on Jun. 4, 2011, the disclosure of which is incorporated by reference in its entirety for all purposes.

BACKGROUND

1. Field

The present invention relates to a module and method for determining a named entity of a terminology using a named entity dictionary and a mining rule combined with an ontology schema, in which if two or more named entities corresponding to a terminology connected to the ontology schema are searched, a mining rule connected to a relationship name of the ontology schema is searched from a mining rule database, and a named entity of the terminology is selected using the mining rule.

2. Description of the Related Art

Recently, data models using ontology are spotlighted in relation to studies on semantic webs. The ontology is a working model of entities and interactions existing in a specific domain.

That is, the ontology conceptualizes and specifies knowledge in the specific domain and can be defined as a network or a graph having a relationship among the concepts used in the domain.

The ontology is constructed by obtaining knowledge related to constitutional elements of the ontology to be constructed in the ontology, such as concepts, attributes of the concepts, and connection relations among the concepts, from documents related to a specific field, defining concepts and attributes, and setting relations among the concepts.

In addition, in order to give meanings to web resources, the ontology can be expressed as a resource description framework (RDF) which is a 3-dimensional structure of resource, attribute, and attribute value.

The RDF is constructed as a concept of resource, property, and statement. All things of an inputted document are expressed as resources, and the RDF can express properties of each resource and relation of the resource with the other resources.

A RDF network can be constructed by detecting named entities from a text and converting the named entities into corresponding RDF triples using mining rules.

Here, the named entity is a word or a set of words that can be classified, such as a name of a person or an organization, a title of music, a name of broadcasting, or a name of a place, and the mining rule is a rule configured with a mining pattern and an RDF triple that can be obtained from the mining pattern.

A variety of methods can be used to detect a named entity and to apply a mining rule, and an RDF network can constructed by detecting a named entity and applying a mining rule using a named entity dictionary that previously stores a relation between a terminology and a named entity or a mining rule database that previously stores a relation between a mining pattern and an RDF triple.

In order to detect a named entity or apply a mining rule using the named entity dictionary or the mining rule database, it is required to update data stored in the named entity dictionary or the mining rule database and to solve ambiguity of the named entity.

SUMMARY

Therefore, the present invention has been made in view of the above problems, and it is an object of the present invention to provide a module and method for determining a named entity of a terminology using a named entity dictionary and a mining rule combined with an ontology schema, and a recording medium which can be read by an electronic device that has recorded the method, in which the named entity of the terminology connected to a concept (class) of the ontology schema is selected using the named entity dictionary and a mining rule database.

To accomplish the above object, according to one aspect of the present invention, there is provided a module for determining a named entity of a terminology using a named entity dictionary and a mining rule combined with an ontology schema, the module including: a named entity dictionary and mining rule database for storing the named entity dictionary in which a named entity of a terminology combined with the ontology schema and connected to a concept (class) is defined, and a mining rule database in which a mining rule configured with a mining pattern and a resource description framework (RDF) triple combined with the ontology schema and connected to a relationship name (property) is defined; a named entity and mining rule search unit for searching for a corresponding mining rule and a named entity respectively from the mining rule database and the named entity dictionary using an inputted mining pattern and a terminology included in the mining pattern; and a names entity selection unit for selecting, if two or more named entities corresponding to the terminology are searched, a named entity matching to the concept configuring the RDF triple of the searched mining rule as a named entity of the terminology among the searched named entities.

The module for determining a named entity of a terminology using a named entity dictionary and a mining rule combined with an ontology schema may further include a verification interface for displaying one or more of the named entity selected for the terminology, a representative terminology among terminologies, and the RDF triple of the mining rule.

The named entity dictionary may connect and store authority data comprising a named entity corresponding to the concept (class) of the ontology schema, a terminology classified as the named entity, an identifier of the terminology, a representative terminology, and an identifier of the representative terminology in one format.

The named entity selection unit may select a matching named entity by comparing the concept configuring an RDF triple of the searched mining rule with the two more searched named entities.

According to another aspect of the present invention, there is provided a method for determining a named entity of a terminology using a named entity dictionary and a mining rule combined with an ontology schema, which searches for a named entity or an identifier of a terminology recognized from an inputted text document using the named entity dictionary in which a named entity of a terminology combined with the ontology schema and connected to a concept (class) is defined, and a mining rule database in which a mining rule configured with a mining pattern and a resource description framework (RDF) triple combined with the ontology schema and connected to a relationship name (property) is defined, the method including the steps of: searching for a corresponding mining rule and a named entity respectively from the mining rule database and the named entity dictionary using an inputted mining pattern and a terminology included in the mining pattern; and if two or more named entities corresponding to the terminology are searched, selecting a named entity matching to the concept configuring the RDF triple of the searched mining rule as a named entity of the terminology among the searched named entities.

The step of selecting a named entity corresponding to the terminology using the two or more searched named entities and the one searched mining rule may include the steps of: extracting the concept from the two or more searched named entities and the RDF triple of the mining rule; and selecting a named entity corresponding to the extracted concept as the named entity of the terminology.

The named entity dictionary may connect and store authority data comprising a named entity corresponding to the concept (class) of the ontology schema, a terminology classified as the named entity, an identifier of the terminology, a representative terminology, and an identifier of the representative terminology in one format.

In the step of searching for a corresponding named entity and a mining rule respectively from the named entity dictionary and the mining rule database using the terminology and mining pattern, if there is a plurality of named entities corresponding to the recognized terminology in the named entity dictionary, all the plurality of the named entities may be searched.

According to still another aspect of the present invention, there is provided a recording medium that can be read by an electronic device, for recording a program for executing the method for determining a named entity of a terminology using a named entity dictionary and a mining rule combined with an ontology schema.

DETAILED DESCRIPTION

Figure 1:
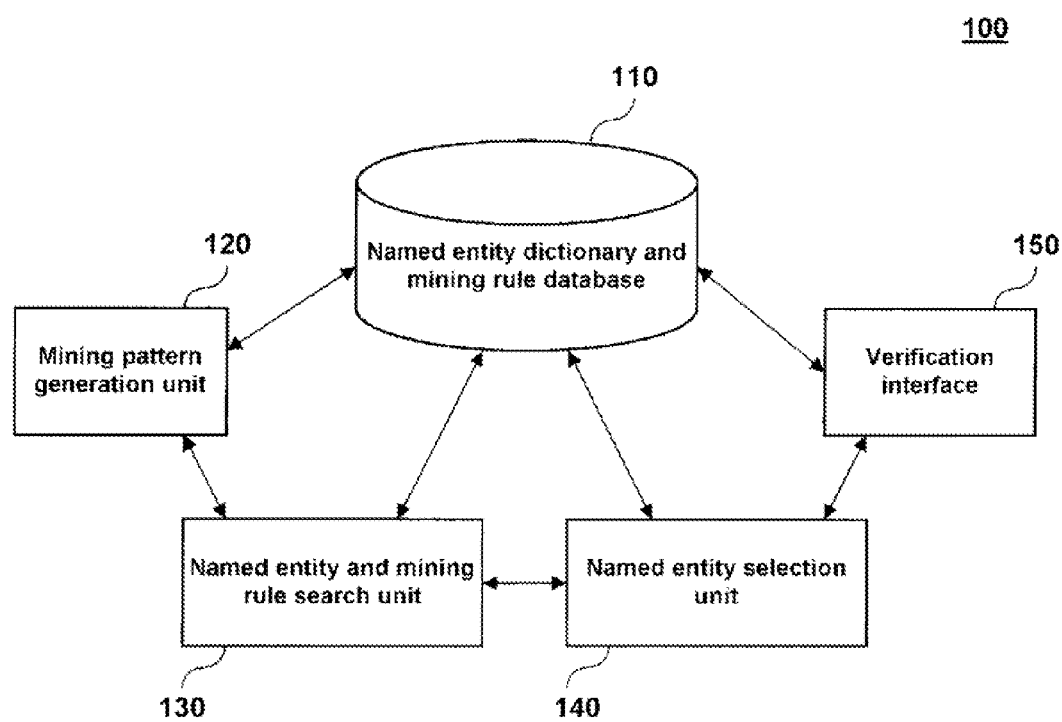
FIG. 1 is a view showing an embodiment of a module for determining a named entity of a terminology using a named entity dictionary and a mining rule combined with an ontology schema according to an aspect of the present invention.

The preferred embodiments of the present invention will be hereafter described in detail, with reference to the accompanying drawings. However, it should be understood that all the modifications, equivalents and substitutions are included within the scope of the invention defined by the claims.

Hereinafter, a module and method for determining a named entity of a terminology using a named entity dictionary and a mining rule combined with an ontology schema, and a recording medium which can be read by an electronic device that has recorded the method will be described in detail with reference to the accompanying drawings. Furthermore, in the drawings illustrating the embodiments of the present invention, elements having like functions will be denoted by like reference numerals and details thereon will not be repeated.

Figure 2:
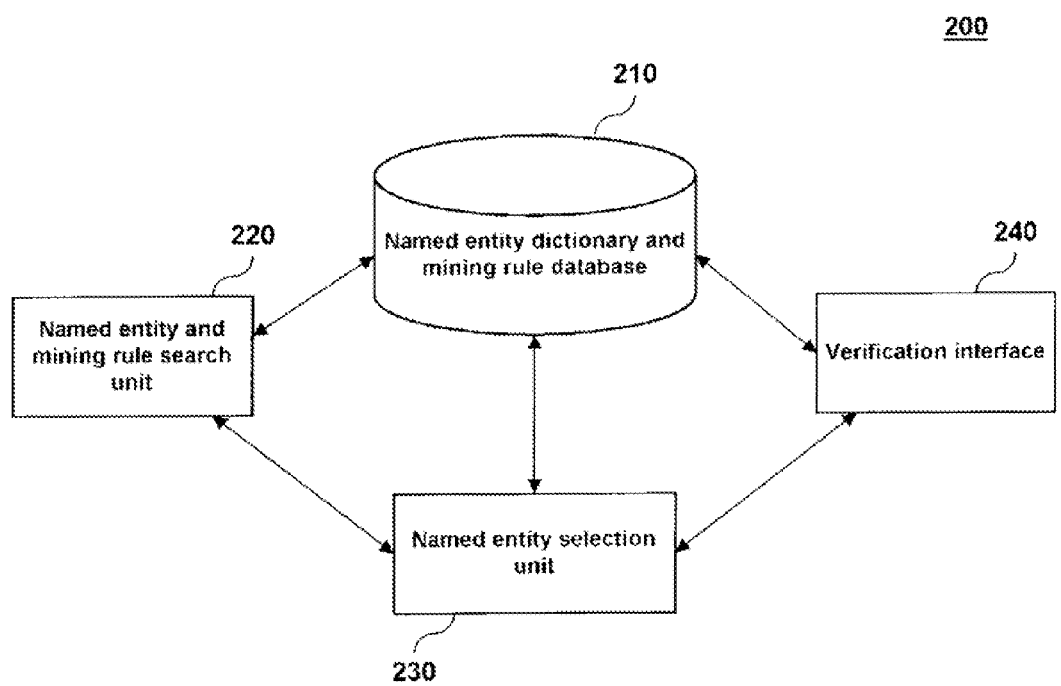
FIG. 2 is a view showing another embodiment of a module for determining a named entity of a terminology using a named entity dictionary and a mining rule combined with an ontology schema according to an aspect of the present invention.
Figure 6:
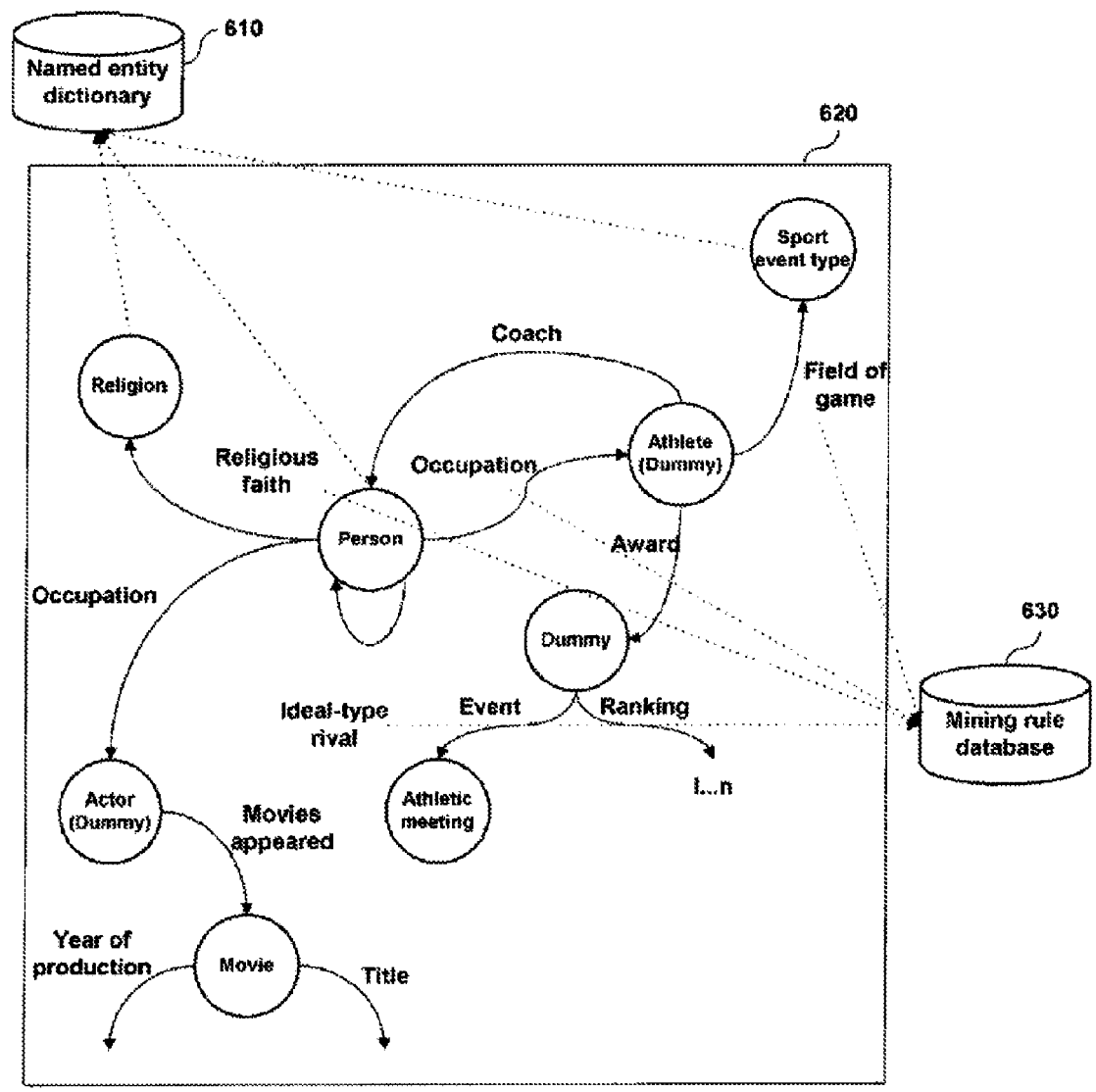
FIG. 6 is a conceptual view showing a connection relation between a named entity dictionary and a mining rule database combined with an ontology schema according to an aspect of the present invention.

FIG. 1 is a view showing an embodiment of a module for determining a named entity of a terminology using a named entity dictionary and a mining rule combined with an ontology schema according to an aspect of the present invention, and FIG. 2 is a view showing another embodiment of a module for determining a named entity of a terminology using a named entity dictionary and a mining rule combined with an ontology schema according to an aspect of the present invention. FIG. 6 is a conceptual view schematically showing a connection relation between a named entity dictionary and a mining rule database combined with an ontology schema according to an aspect of the present invention.

According to a first embodiment of the present invention, as shown in FIG. 1, a module 100 for determining a named entity of a terminology using a named entity dictionary and a mining rule combined with an ontology schema includes a named entity dictionary and mining rule database 110, a mining pattern generation unit 120, a named entity and mining rule search unit 130, a named entity selection unit 140, and a verification interface 150.

The named entity dictionary and mining rule database 110 may store a named entity dictionary and a mining rule database independently or as a database.

The named entity dictionary is a database in which a named entity of a terminology combined with an ontology schema and connected to a concept (class) is defined and stored, and the mining rule database is a database in which a mining rule configured with a mining pattern and a resource description framework (RDF) triple combined with an ontology schema and connected to a relationship name (property) is defined and stored.

As shown in FIG. 6, in the named entity dictionary 610 and the mining rule database 630 associated with the ontology schema 620, a concept (class) of the ontology schema 620 is associated with a named entity of the named entity dictionary 610, and a relationship name (property) of the ontology schema 620 is associated with a relationship name set as a key value of the mining rule database.

For example, a religion, a person, a sport event type, and the like, i.e., concepts of an ontology schema, are defined as a named entity, i.e., a key value of the named entity dictionary, and a specific instance can be defined as a terminology of the named entity dictionary.

In addition, an occupation, religious faith, a field of game, and the like, i.e., relationship names of an ontology schema, are defined as a relationship name, i.e., a key value of the mining rule database, and can be respectively connected to a mining pattern and an RDF triple corresponding to each relationship name.

Accordingly, the named entity dictionary and the mining rule database can be formed in association with the concept or the relationship name of the ontology schema.

The named entity dictionary may connect and store authority data comprising a named entity corresponding to a concept of the ontology schema, a terminology classified as the named entity, an identifier of the terminology, a representative terminology, and an identifier of the representative terminology in one format. The authority data is connected through the named entity of the terminology.

The mining rule database may store the mining rule configured with the mining pattern and the RDF triple.

A mining rule is defined to include a relationship name of the ontology schema, a mining pattern corresponding to the relationship name, and one or more RDF triples corresponding to the mining pattern, and the mining rule database may connect and store the relationship name of the ontology schema, the mining pattern, and the RDF triple in one format.

The mining pattern generation unit 120 may recognize a terminology from a text and convert the terminology into a mining pattern The mining pattern generation module 120 may recognize a terminology from a text using lexical analysis, syntactic analysis, and semantic analysis in association with the named entity dictionary and express the recognized terminology as a named entity corresponding to a terminology stored in the named entity dictionary.

When the recognized terminology is expressed as a named entity corresponding to a terminology stored in the named entity dictionary, if there is a plurality of different named entities corresponding to the same terminology, the mining pattern generation module 120 may search for and extract all the named entities.

In addition, the mining pattern generation module 120 may convert a text document displayed including all the named entities into a mining pattern.

The named entity and mining rule search unit 130 may search for a corresponding named entity and a mining rule respectively from the named entity dictionary and the mining rule database using the recognized terminology and the mining pattern.

If two or more named entities are searched by the named entity and mining rule search unit 130, the named entity selection unit 140 may select a named entity suitable for a terminology connected to a concept using the mining rule.

Since the ontology schema is associated with the named entity dictionary and the ontology schema is associated with the mining rule database respectively, using constitutional elements different from each other (a concept and a relationship name, and a relationship name and a relationship name), ambiguity of the named entity can be solve using the mining rule.

The verification interface 150 may display one or more of a named entity selected for the terminology, a representative terminology among terminologies, and an RDF triple of the mining rule, and a user may determine whether or not the selected named entity is a named entity suitable for the terminology.

For example, if terminologies such as 'apple' and 'computer' are recognized from a text document saying that "Apple said computers are products of the company." and a named entity of each terminology is searched for from the named entity dictionary, '[thing]' or '[company]' can be searched as a named entity of terminology 'apple', and '[thing]' can be searched as a named entity of terminology 'computer'.

Like this, if two or more named entities are searched as a result of searching for a named entity of terminology 'apple', a suitable named entity needs to be determined among the two or more searched named entities.

If the text document is converted into a mining pattern, it can be converted into '% product of [?] jcs [thing] jco % self', and if a mining pattern matching to the mining pattern is searched for from the mining rule database, a mining rule such as '% product of [company1] jcs [thing] jco % self'->' [company1]-product-[thing1]' can be searched.

Here, the concepts configuring the RDF triple of the mining rule are '[company]' and '[thing]', and if '[company]' and '[thing]' are matched to the searched named entity, the named entity of 'computer' is '[thing]', and thus '[company]' can be selected as a named entity of 'apple'. Therefore, ambiguity of the named entity can be solved.

According to a second embodiment of the present invention, as shown in FIG. 2, a module 200 for determining a named entity of a terminology using a named entity dictionary and a mining rule combined with an ontology schema may include a named entity dictionary and mining rule database 210, a named entity and mining rule search unit 220, a named entity selection unit 230, and a verification interface 240.

The module 200 for determining a named entity of a terminology using a named entity dictionary and a mining rule combined with an ontology schema according to a second embodiment of the present invention has a configuration omitting the mining pattern generation unit from the configuration of the first embodiment, and it means that it is a module that determines a named entity of a terminology when a mining pattern is directly inputted into the module 200 for determining a named entity of a terminology using a named entity dictionary and a mining rule combined with an ontology schema.

The functions of the named entity and mining rule search unit 220, and the named entity selection unit 230, and the verification interface 240 of the module 200 for determining a named entity of a terminology using a named entity dictionary and a mining rule combined with an ontology schema are the same as those of the named entity and mining rule search unit 130, the named entity selection unit 140, and the verification interface 150 of the first embodiment.

However, there is a difference in that the named entity and mining rule search unit 130 of the first embodiment receives a recognized terminology and a converted mining pattern from the mining pattern generation unit 120 and searches for a named entity and a mining rule using the received terminology and mining pattern, whereas the named entity and mining rule search unit 220 of the second embodiment directly receives a mining pattern from a user and searches for a named entity and a mining rule using the mining pattern and a terminology included in the mining pattern.

Figure 3:
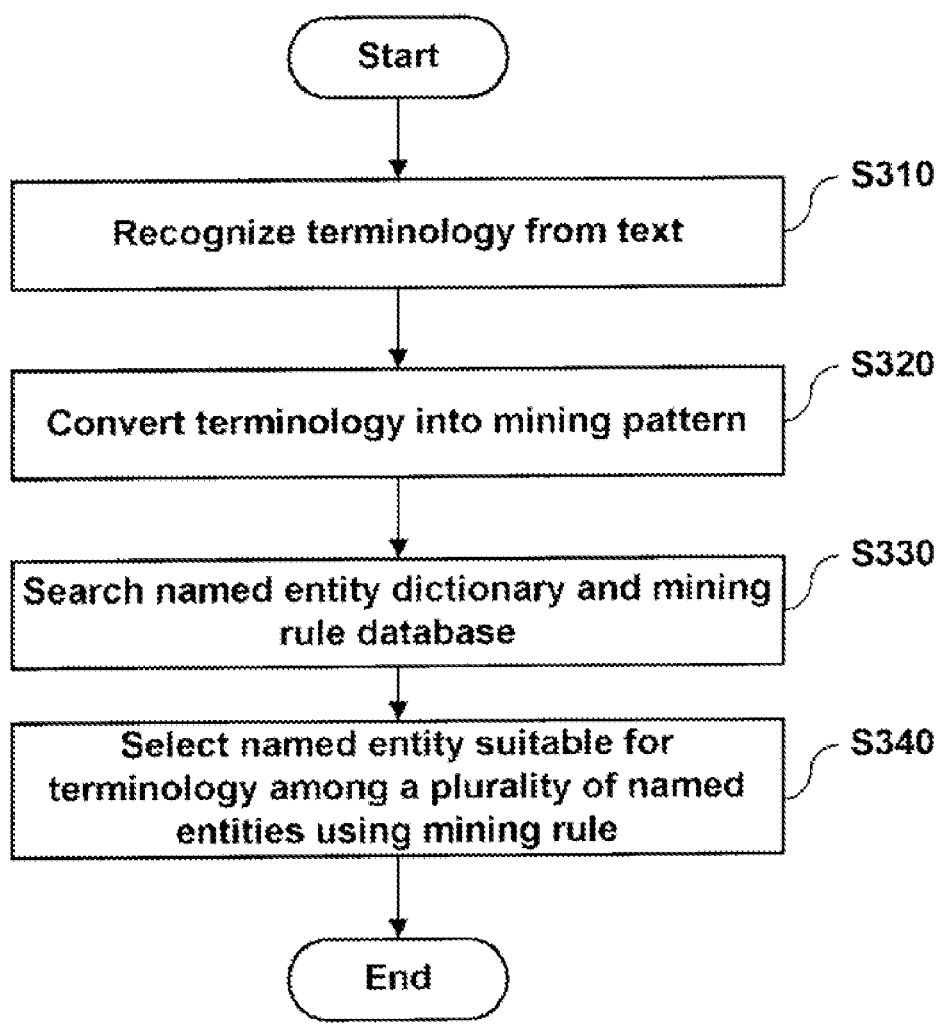
FIG. 3 is a flowchart illustrating an embodiment of a method for determining a named entity of a terminology using a named entity dictionary and a mining rule combined with an ontology schema according to another aspect of the present invention.
Figure 4:
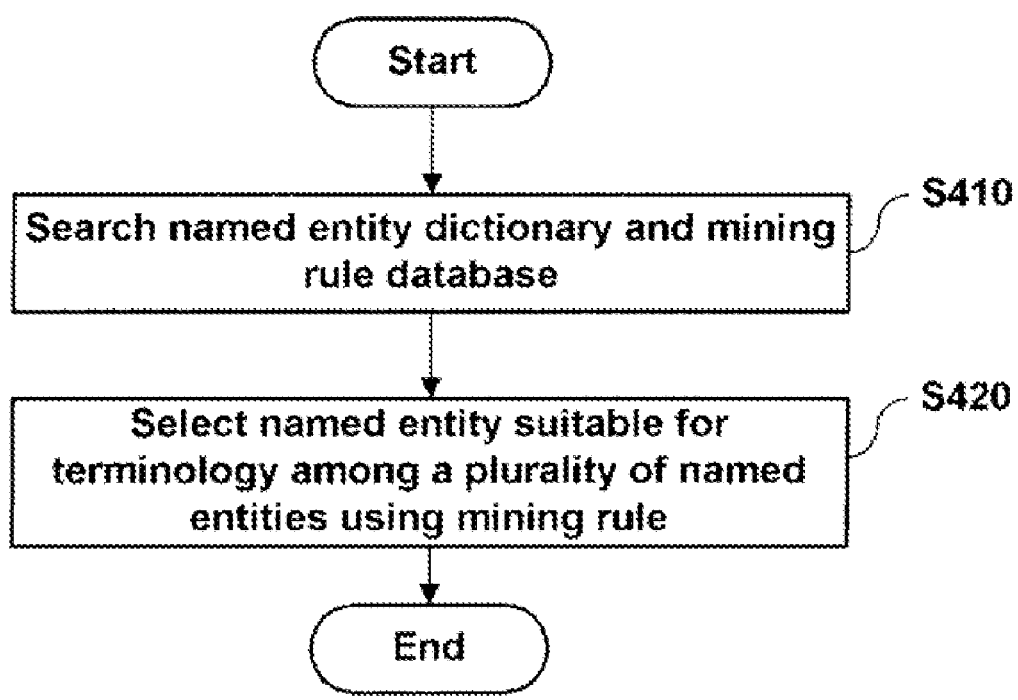
FIG. 4 is a flowchart illustrating another embodiment of a method for determining a named entity of a terminology using a named entity dictionary and a mining rule combined with an ontology schema according to another aspect of the present invention.
Figure 5:
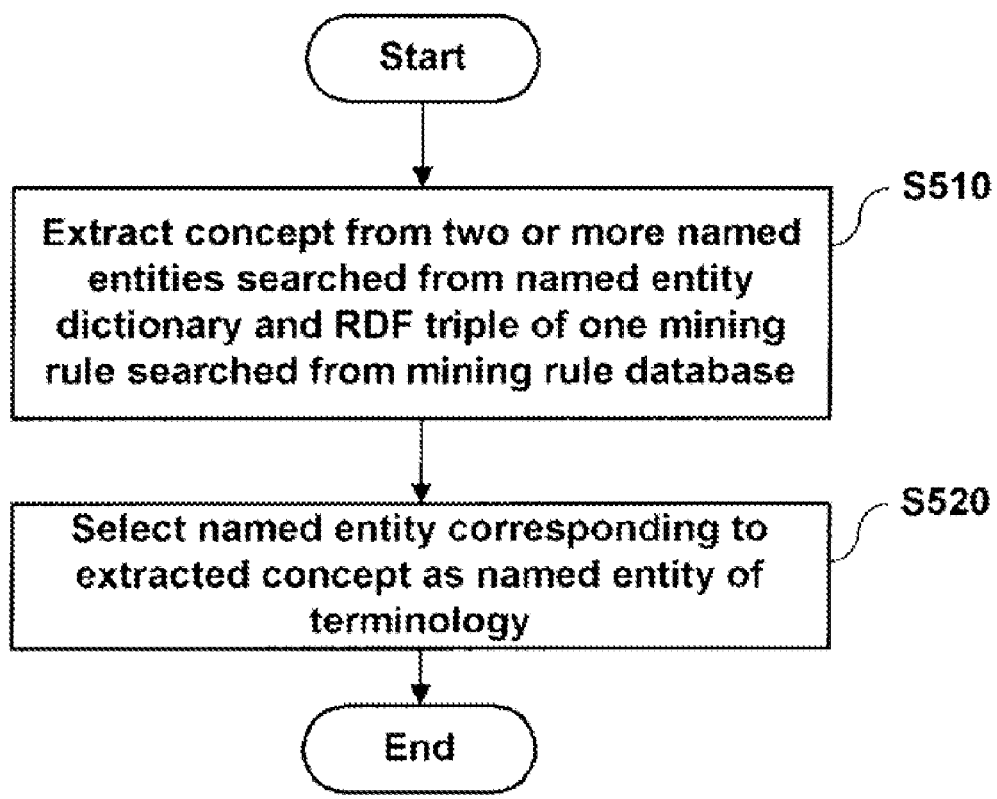
FIG. 5 is a flowchart illustrating a process of selecting a named entity suitable for a terminology among a plurality of named entities in a method for determining a named entity of a terminology using a named entity dictionary and a mining rule combined with an ontology schema according to another aspect of the present invention.

FIG. 3 is a flowchart illustrating an embodiment of a method for determining a named entity of a terminology using a named entity dictionary and a mining rule combined with an ontology schema according to another aspect of the present invention, FIG. 4 is a flowchart illustrating another embodiment of a method for determining a named entity of a terminology using a named entity dictionary and a mining rule combined with an ontology schema according to another aspect of the present invention, and FIG. 5 is a flowchart illustrating a process of selecting a named entity suitable for a terminology among a plurality of named entities in a method for determining a named entity of a terminology using a named entity dictionary and a mining rule combined with an ontology schema according to another aspect of the present invention.

According to a first embodiment of the present invention, a method for determining a named entity of a terminology using a named entity dictionary and a mining rule combined with an ontology schema may comprise the steps of: recognizing a terminology from a text S310; converting the terminology into a mining pattern S320; searching for a terminology and a mining rule from the named entity dictionary and the mining rule database S330; and selecting a named entity suitable for the terminology among a plurality of named entities using the mining rule.

If a plurality of named entities is searched for the same terminology as a result of searching for a terminology and a mining rule from the named entity dictionary and the mining rule database of step S330, a named entity suitable for the terminology recognized from the text document can be determined using a mining rule associated with the ontology schema.

For example, if terminologies such as 'Yuna Kim' and 'Johnny Weir' are recognized from a text document saying that "It is said that Yuna Kim said Johnny Weir is her ideal type." and a named entity is searched for each of the terminologies from the named entity dictionary, '[person]' is searched as a named entity of terminology 'Yuna Kim', whereas a named entity of terminology 'Johnny Weir' is not searched, or '[person]' or '[thing]' can be searched as a named entity corresponding to 'Johnny Weir'.

Like this, if two or more named entities are searched or no named entity is searched as a result of searching for a named entity of terminology 'Johnny Weir', a named entity needs to be determined.

If the text document is converted into a mining pattern, it can be converted into '% ideal_type of [person1] jcs [?] jco % self', and if a mining pattern matching to the mining pattern is searched for from the mining rule database, a mining rule such as '% ideal_type of [person1] jcs [person2] jco % self'->'[person1]-ideal_type-[person2]' can be searched.

Here, the concepts configuring the RDF triple of the mining rule are '[person]' and '[person]', and if '[person]' and '[person]' are matched to the searched named entity, the named entity of 'Yuna Kim' is '[person]', and thus '[person]' can be selected as a named entity of 'Johnny Weir'. Therefore, ambiguity of the named entity can be solved.

According to a second embodiment of the present invention, a method for determining named entity of a terminology using a named entity dictionary and a mining rule combined with an ontology schema may directly receive a mining pattern from a user and search for a named entity and a mining rule from the named entity dictionary and the mining rule database using the inputted mining pattern and a terminology included in the mining pattern S410, and select a named entity suitable for the terminology among a plurality of named entities using the searched mining rule.

In addition, one or more of a terminology, a named entity selected for the terminology, a representative terminology, and an identifier of the representative terminology are displayed on the verification interface so that a user can confirm whether or not the named entity of the terminology is suitable.

According to another aspect of the present invention, a program for executing the method for determining a named entity of a terminology using a named entity dictionary and a mining rule combined with an ontology schema can be recorded in a recording medium that can be read by an electronic device.

The method for determining a named entity of a terminology using a named entity dictionary and a mining rule combined with an ontology schema can be implemented as a computer program, and computer programmers in the art can easily contrive codes and code segments configuring the program.

In addition, the method for determining a named entity of a terminology using a named entity dictionary and a mining rule combined with an ontology schema is stored in an information storage medium (a computer readable medium) that can be read by a computer, and a named entity suitable for the terminology can be determined by reading and executing the program through the computer.

According to the present invention, linguistic resources can be managed in an integrated manner using a named entity dictionary associated with a concept (class) of an ontology schema and a mining rule database associated with a relationship name (property) of the ontology schema.

Furthermore, if a plurality of named entities corresponding to a terminology is searched from the named entity dictionary using association relation of the ontology schema, the named entity dictionary, and the mining rule database, a named entity suitable for the terminology is determined, and thus ambiguity of the named entity can be solved.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A non-transitory computer readable storage medium having a module stored therein for determining a named entity of a terminology using a named entity dictionary and a mining rule combined with an ontology schema, the module comprising:
   a named entity dictionary and mining rule database for storing the named entity dictionary in which a named entity of a terminology combined with the ontology schema and connected to a concept (class) is defined, and
   a mining rule database in which a mining rule configured with a mining pattern and a resource description framework (ROF) triple combined with the ontology schema and connected to a relationship name (property) is defined;
   a named entity and mining rule search unit for searching for a corresponding mining rule and a named entity respectively from the mining rule database and the named entity dictionary using an inputted mining pattern and a terminology included in the mining pattern; and
   a names entity selection unit for selecting, if two or more named entities corresponding to the terminology are searched,
   a named entity matching to the concept configuring the ROF triple of the searched mining rule as a named entity of the terminology among the searched named entities.

2. The module according to claim 1, further comprising:
   a verification interface for displaying one or more of the named entity selected for the terminology, a representative terminology among terminologies, and the RDF triple of the mining rule.

3. The module according to claim 1, wherein the named entity dictionary connects and stores authority data comprising a named entity corresponding to the concept (class) of the ontology schema, a terminology classified as the named entity, an identifier of the terminology, a representative terminology, and an identifier of the representative terminology in one format.

4. The module according to claim 1, wherein the named entity selection unit selects a matching named entity by comparing the concept configuring an RDF triple of the searched mining rule with the two more searched named entities.

5. A method for determining a named entity of a terminology using a named entity dictionary and a mining rule combined with an ontology schema, which searches for a named entity or an identifier of a terminology recognized from an inputted text document using the named entity dictionary in which a named entity of a terminology combined with the ontology schema and connected to a concept (class) is defined, and a mining rule database in which a mining rule configured with a mining pattern and a resource description framework (RDF) triple combined with the ontology schema and connected to a relationship name (property) is defined, the method comprising the steps of:

searching for a corresponding mining rule and a named entity respectively from the mining rule database and the named entity dictionary using an inputted mining pattern and a terminology included in the mining pattern; and if two or more named entities corresponding to the terminology are searched, selecting a named entity matching to the concept configuring the RDF triple of the searched mining rule as a named entity of the terminology among the searched named entities.

6. The method according to claim 5, wherein the step of selecting a named entity corresponding to the terminology using the two or more searched named entities and the one searched mining rule includes the steps of:

extracting the concept from the two or more searched named entities and the RDF triple of the mining rule; and selecting a named entity corresponding to the extracted concept as the named entity of the terminology.

7. The method according to claim 5, wherein the named entity dictionary connects and stores authority data comprising a named entity corresponding to the concept (class) of the ontology schema, a terminology classified as the named entity, an identifier of the terminology, a representative terminology, and an identifier of the representative terminology in one format.

8. The method according to claim 5, wherein in the step of searching for a corresponding named entity and a mining rule respectively from the named entity dictionary and the mining rule database using the terminology and the mining pattern, if there is a plurality of named entities corresponding to the recognized terminology in the named entity dictionary, all the plurality of the named entities are searched.

9. A recording medium that can be read by an electronic device according to claim 5, for recording a program for executing the method for determining a named entity of a terminology using a named entity dictionary and a mining rule combined with the ontology schema.

* * * * *